US009096200B2

(12) United States Patent
Zeoli et al.

(10) Patent No.: US 9,096,200 B2
(45) Date of Patent: Aug. 4, 2015

(54) ATTENUATOR FOR A VEHICLE BRAKING SYSTEM

(75) Inventors: Joseph F. Zeoli, Livonia, MI (US); Blaise Ganzel, Ann Arbor, MI (US); Thomas Wald, Hollnich (DE); Richard A. Swarich, Plymouth, MI (US); Joseph A. Starr, Plymouth, MI (US); David Lopez-Larequi, Koblenz (DE)

(73) Assignee: Kelsey-Hayes Company, Livonia, MI (US)

( * ) Notice: Subject to any disclaimer, the term of this patent is extended or adjusted under 35 U.S.C. 154(b) by 525 days.

(21) Appl. No.: 13/388,133

(22) PCT Filed: Aug. 11, 2010

(86) PCT No.: PCT/US2010/045159
§ 371 (c)(1),
(2), (4) Date: Jan. 31, 2012

(87) PCT Pub. No.: WO2011/028376
PCT Pub. Date: Mar. 10, 2011

(65) Prior Publication Data
US 2012/0133201 A1 May 31, 2012

Related U.S. Application Data

(60) Provisional application No. 61/236,232, filed on Aug. 24, 2009, provisional application No. 61/314,767, filed on Mar. 17, 2010.

(51) Int. Cl.
*B60T 8/1755* (2006.01)
*B60T 7/22* (2006.01)
(Continued)

(52) U.S. Cl.
CPC ............... *B60T 8/1755* (2013.01); *B60T 7/22* (2013.01); *B60T 8/368* (2013.01); *B60T 8/4068* (2013.01); *B60T 8/4291* (2013.01); *B60T 8/4872* (2013.01); *B60T 2201/02* (2013.01)

(58) Field of Classification Search
CPC ......... B60T 7/22; B60T 8/1755; B60T 8/368; B60T 8/4068; B60T 8/4291; B60T 8/4872; B60T 2201/02

USPC ............ 303/10, 116.1, 116.4, 87; 138/26, 30, 138/31
See application file for complete search history.

(56) References Cited

U.S. PATENT DOCUMENTS 5,058,961 A * 10/1991 Mergenthaler et al. ..... 303/115.4
5,320,203 A * 6/1994 Wilber et al. .............. 192/109 F
(Continued)

FOREIGN PATENT DOCUMENTS

| WO | 0214130 A1 | 2/2002 |
| WO | 2009103709 A1 | 8/2009 |
| WO | WO2009103709 A1 * | 8/2009 |

OTHER PUBLICATIONS

Chinese First Office Action, Application No. CN 201080037595.8, dated Mar. 3, 2014.

*Primary Examiner* — Robert A Siconolfi
*Assistant Examiner* — Charles Poon
(74) *Attorney, Agent, or Firm* — MacMillan, Sobanski & Todd, LLC

(57) ABSTRACT

A vehicle braking system includes a slip control system operable in an electronic stability control (ESC) mode to automatically and selectively apply the brakes in an attempt to stabilize the vehicle when an instability condition has been sensed. The slip control system is further operable in an adaptive cruise control (ACC) mode to automatically apply the brakes to slow the vehicle in response to a control signal. The slip control system includes a variable speed motor drive piston pump for supplying pressurized fluid pressure to the brakes through a valve arrangement. In the ESC mode, the pump motor operates in an ESC speed range, and in the ACC mode, the pump motor operates in an ACC speed range lower than the ESC speed range. The slip control system further includes an attenuator connected to a pump outlet for dampening pump output pressure pulses prior to application to the brakes. The attenuator includes an elastomeric member located in an attenuator chamber of a housing. The attenuator chamber defines a shoulder and the elastomeric member includes a flange which rests on the shoulder and locates the elastomeric member in a predetermined axial position within the attenuator chamber. An outside wall of the elastomeric member includes circumferentially extending grooves defining ribs between adjacent grooves.

8 Claims, 9 Drawing Sheets

(51) Int. Cl.
  *B60T 8/36* (2006.01)
  *B60T 8/40* (2006.01)
  *B60T 8/42* (2006.01)
  *B60T 8/48* (2006.01)

(56) References Cited

U.S. PATENT DOCUMENTS

| | | | |
|---|---|---|---|
| 5,540,486 A | 7/1996 | Linkner | |
| 5,682,923 A * | 11/1997 | Goloff et al. | 138/30 |
| 5,803,555 A * | 9/1998 | Schaefer | 303/87 |
| 5,921,636 A | 7/1999 | Roberts | |
| 6,017,099 A * | 1/2000 | Schneider et al. | 303/87 |
| 6,164,336 A * | 12/2000 | Pasquet et al. | 138/30 |
| 6,203,117 B1 * | 3/2001 | Starr et al. | 303/87 |
| 6,217,129 B1 * | 4/2001 | Ganzel | 303/11 |
| 6,304,808 B1 | 10/2001 | Milot | |
| 6,446,490 B1 * | 9/2002 | Lohner et al. | 73/39 |
| 6,533,366 B1 * | 3/2003 | Barron et al. | 303/113.1 |
| 6,651,698 B1 * | 11/2003 | Wilkes | 138/30 |
| 2002/0067073 A1 * | 6/2002 | Gegalski et al. | 303/119.1 |
| 2002/0180257 A1 * | 12/2002 | Gill et al. | 303/7 |
| 2007/0120418 A1 | 5/2007 | Kajita et al. | |
| 2008/0284242 A1 * | 11/2008 | Ganzel | 303/114.1 |
| 2009/0055068 A1 * | 2/2009 | Osaki et al. | 701/87 |
| 2009/0076699 A1 * | 3/2009 | Osaki et al. | 701/78 |
| 2009/0077963 A1 * | 3/2009 | Ganzel | 60/562 |

* cited by examiner

ATTENUATOR FOR A VEHICLE BRAKING SYSTEM

CROSS REFERENCE TO RELATED APPLICATIONS

This application claims the benefit of U.S. Provisional Application Nos. 61/236,232 filed Aug. 24, 2009 and 61/314,767 filed Mar. 17, 2010.

BACKGROUND

Various embodiments of an attenuator are described herein. In particular, the embodiments described herein relate to an improved attenuator for use in a vehicle braking system and a vehicle braking system equipped with the attenuator.

Devices for autonomously generating brake pressure have been a part of the prior art since the introduction of driver assistance functions, such as, for example, a vehicle stability control (VSC), and are being built into vehicles during series production. Autonomously generating brake pressure makes it possible to brake individual wheels or all wheels of the vehicle independent of the driver actuating the brake. In the meantime, additional driver assistance functions beyond the safety-related VSC have been developed to the point of readiness for series production which assume safety functions as well as comfort functions. Adaptive cruise control (ACC) is a part of this for example.

When the ACC function is activated, the distance and relative speed of a vehicle traveling up ahead is recorded by laser distance sensors or preferably radar distance sensors. Like conventional cruise control, the ACC function maintains a speed selected by the driver until a slower vehicle traveling up ahead is registered and a safe distance from it is no longer being maintained. In this case, the ACC function engages by braking to a limited extent and if needed by subsequent acceleration in order to maintain a defined spatial or temporal distance from the vehicle traveling up ahead. Additional ACC functions are expanded to the extent of also braking the vehicle to a stop. This is used for example in the case of a so-called follow-to-stop function or a function to minimize a collision.

Further developments also permit a so-called stop-and-go function, wherein the vehicle also starts automatically if the vehicle up ahead is set in motion again. To do so, the stop-and-go function must be able to execute a frequently changing autonomous pressure build-up to approx. 30 to 40 bar in the vehicle braking system independent of the generation of brake pressure originating from the driver. In the case of typical speeds on freeways, an autonomous deceleration is often restricted to approx. 0.2 g, at lower speeds, on the other hand, the system can generate an autonomous deceleration of 0.6 g for example. A further development also includes an automatic emergency brake (AEB), whereby the ACC function detects potential accident situations in due time, warns the driver and simultaneously initiates measures to autonomously brake the vehicle with full force. In this case, rapid pressure build-up rates to brake pressures of approximately 100 bar and greater are required.

Correspondingly powerful devices for autonomously generating brake pressure include pumps, such as piston pumps, which can be annoying sources of noise. In particular the conveyance of brake fluid through piston pumps generates pulsations, which can spread audibly via brake circuits and also affect the noise level in the vehicle's interior.

To dampen noises or pulsations, devices for autonomously generating brake pressure are known that feature a throttle on the outlet side of the pump. U.S. Pat. No. 5,540,486 shows, in FIG. 1 for example, a pump 24 with an attenuator 26 arranged downstream from same and an orifice 28. Printed document WO 02/14130 A1 shows a vehicle braking system, which comprises a device for autonomously generating brake pressure with a pump 8, a compensating tank 48 arranged downstream from the pump and a throttle 49. Namely by using a throttle, the pump noises can be damped and an improvement in comfort is achieved, however, the throttle has a limiting effect on the pressure build-up rates.

The use of attenuators which reduce amplitude of pressure fluctuations in hydraulic fluid lines of vehicular braking systems is well known. In particular, attenuators are common in vehicular anti-lock braking systems (ABS) at the outlet end of an ABS hydraulic pump used to evacuate the low pressure accumulator. A hydraulic control unit (HCU) includes a housing having bores for mounting valves and the like and channels for directing fluid. An attenuator is mounted in a bore in the HCU to significantly reduce the amplitude of high energy pressure pulses in the brake fluid at the outlet of the pump. Such pressure pulses can create noise which is transmitted to the master cylinder or its connection to the vehicle.

One known attenuator includes a closed chamber filled with brake fluid. An inlet passage delivers fluid from the outlet end of the pump. An orifice of substantially reduced diameter directs fluid from the chamber to an outlet passage. The restriction of fluid flow through the orifice attenuates pressure fluctuations as a result of the compressibility of the brake fluid. Thus, brake fluid in the chamber absorbs high energy fluid pulses and slowly releases the fluid through the orifice.

Another known attenuator for use in an ABS system is disclosed in U.S. Pat. No. 5,540,4306 to Linkner. The attenuator 26 includes an elastomer core piece 410'. The core piece 410' includes an annular seal 66' at the head end 412' of the attenuator and an axially extending compression rib 52'.

Another known attenuator for use in an ABS system is disclosed in U.S. Pat. No. 5,921,6404 to Roberts. The attenuator 70 includes a cylinder 72 slidably received in a bore 73 of the housing 400. A cap 74 is integrally formed with the cylinder 72. An elastomeric plug 80 is received in the cylinder 72. The plug 80 has a shape complementary to the tapered interior surface of the cylinder 72. An annular groove 86 is formed in an outer surface of the plug 80. The inner end of the plug 80 includes an inwardly projecting stem 88 which engages a bottom wall of the bore 73.

To achieve the pressure build-up rates required for driver assistance functions, a more powerful pump can be connected upstream from the throttle. However, the manufacturing costs of the vehicle braking system increase with the higher pumping capacity, which stands in the way of using the driver assistance functions in more economically priced vehicles. In addition, a throttle can significantly reduce the service life of the pump or disproportionately increase the load on the vehicle's electrical system through higher motor currents.

SUMMARY

The present application describes various embodiments of a vehicle braking system. One embodiment of the vehicle braking system includes a slip control system operable in an electronic stability control (ESC) mode to automatically and selectively apply the brakes in an attempt to stabilize the vehicle when an instability condition has been sensed. The slip control system is further operable in an adaptive cruise control (ACC) mode to automatically apply the brakes to slow the vehicle in response to a control signal. The slip control system includes a variable speed motor drive piston pump for supplying pressurized fluid pressure to the brakes through a valve arrangement. In the ESC mode, the pump motor operates in an ESC speed range, and in the ACC mode, the pump motor operates in an ACC speed range lower than the ESC speed range. The slip control system further includes an attenuator connected to a pump outlet for dampening pump output pressure pulses prior to application to the brakes. The attenuator includes an elastomeric member located in an attenuator chamber of a housing. The attenuator chamber defines a shoulder and the elastomeric member includes a flange which rests on the shoulder and locates the elastomeric member in a predetermined axial position within the attenuator chamber. An outside wall of the elastomeric member includes circumferentially extending grooves defining ribs between adjacent grooves.

Other advantages of the vehicle braking system will become apparent to those skilled in the art from the following detailed description, when read in light of the accompanying drawings.

DETAILED DESCRIPTION

Figure 1:
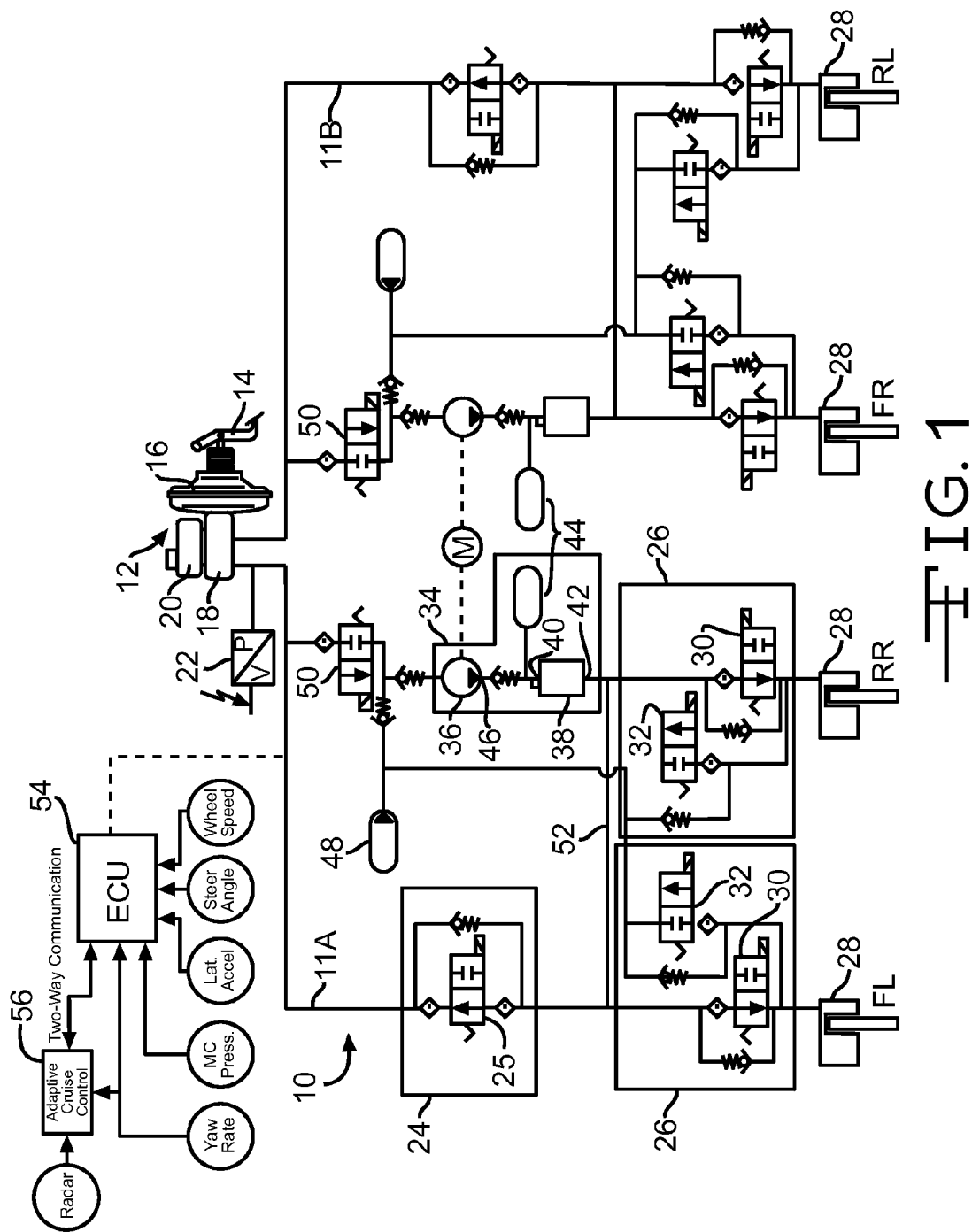
FIG. 1 is a hydraulic circuit diagram of a vehicle braking system with an attenuator according to the invention.

A hydraulic vehicle braking system is indicated generally at 10 in FIG. 1. The illustrated embodiment of the vehicle brake system 10 includes valves and other components described below to provide an electronic stability control (ESC) capability. The vehicle braking system 10 includes a slip control system operable in an ESC mode to automatically and selectively apply the brakes in an attempt to stabilize the vehicle when an instability condition has been sensed by any of the sensors providing data to the ECU 54. The vehicle brake system 10 is intended to be exemplary and it will be appreciated that there are other brake control system configurations that may be used to implement the various valve embodiments described herein. In other embodiments, the brake system 10 may include components to provide an anti-lock braking, traction control, and/or vehicle stability control function.

The slip control system is further operable in an adaptive cruise control (ACC) mode to automatically apply the brakes to slow the vehicle in response to a control signal, as shown in FIG. 1. The slip control system includes a variable speed motor drive piston pump 36, described below, for supplying pressurized fluid pressure to the brake cylinders 28 of the brakes through a valve arrangement. In the ESC mode, the pump motor 39 operates in an ESC speed range, and in the ACC mode, the pump motor 39 operates in an ACC speed range lower than the ESC speed range. The slip control system further includes an attenuator assembly 44 connected to a pump outlet 46 for dampening pump output pressure pulses prior to application to the brakes. As described in detail below, the various embodiments of the attenuator assembly further include an elastomeric member located in an attenuator chamber of a housing.

The vehicle brake system 10 has two separate brake circuits 11A and 11B, respectively, which are depicted on the left and right halves of FIG. 1. In the exemplary embodiment illustrated in FIG. 1, the circuits supply brake pressure to a front and rear wheel brake. The illustrated rear wheel brake is arranged diagonally to the front wheel brake. Only a left brake circuit 11A in FIG. 1 is described in the following in more detail, however a right brake circuit 11B in FIG. 1 is structured in the same manner.

The brake system 10 includes a driver-controlled first pressure generating unit 12 with a brake pedal 14, a power brake unit 16 and a tandem master brake cylinder 18, which presses the brake fluid out of a reservoir 20 into the two brake circuits 11A and 11B. Arranged behind an outlet of the tandem master brake cylinder 18 is a pressure sensor 22 for detecting the driver's input.

Under normal driving conditions, a brake fluid pressure emanating from the driver-controlled first pressure generating unit 12 continues via the block valve arrangement 24 and an anti-lock brake system (ABS) valve arrangement 26 to wheel brake cylinders 28. The illustrated block valve arrangement 24 is part of a traction control (TC) system and includes a normally open or isolation valve 25 that is opened in a currentless state. The ABS valve arrangement 26 includes an ABS inlet valve 30 and an ABS discharge valve 32. The ABS inlet valve 30 is a normally open or isolation valve, and the ABS discharge valve 32 is a normally closed or dump valve. Each wheel brake cylinder 28 includes an ABS valve arrangement 26 and the brake fluid pressure of both brake circuits is distributed diagonally in the vehicle to a respective pair of wheel brake cylinders 28 (front left (FL) and rear right (RR), or front right (FR) and rear left (RL)), respectively. In a current-carrying state the block valve arrangement 24 is blocked from a backflow of brake fluid from the wheel brake cylinders 28 to the master brake cylinder 18.

Brake fluid pressure may be built up independent of the driver-controlled first pressure generating unit 12 by an autonomous second pressure generating unit 34. The autonomous second pressure generating unit 34 includes a variable speed motor drive piston pump 36 and a two-stage or switchable orifice 38 (schematically illustrated in FIG. 1, but shown in detail in FIG. 8). The two-stage orifice 38 has an inlet side 40 and an outlet side 42. Downstream from the pump 36, the two-stage orifice 38 dampens flow pulsation.

The second pressure generating unit 34 may further include an attenuator 44. The attenuator 44 is in fluid communication with a pump outlet 46 and the inlet side 40 of the two-stage orifice 38. Pulsations emanating from the pump 36 are periodic fluctuations in the brake fluid flow. The attenuator 44 takes in brake fluid during the pulsation peaks and releases it again between the pulsation peaks. As a result, the attenuator 44 levels out a temporal pressure progression on the inlet side 40 of the two-stage orifice 38. Because a flow speed of the brake fluid is determined by the two-stage orifice 38 from the inlet-side brake fluid pressure, the second pressure generating unit 34 produces an especially uniform brake fluid flow at the outlet side 42 of the two-stage orifice 38.

Arranged on the intake side of the pump 36 are a low pressure accumulator (LPA) 48 and a pump inlet valve 50. The illustrated pump inlet valve 50 is a normally closed or dump valve. When the pump inlet valve 50 is currentless and closed, the pump 36 is supplied with brake fluid from the LPA 48. When the pump inlet valve 50 is current-carrying and open, the pump 36 can also suction brake fluid from the master brake cylinder 18.

The driver-controlled first pressure generating unit 12 and the autonomous second pressure generating unit 34 convey brake fluid in a common brake branch 52 of one of the two brake circuits. As a result, both pressure generating units 12, 34 can build up brake fluid pressure to the wheel brake cylinders 28 of the brake circuit independent of one another.

The vehicle brake system 10 described in the foregoing uses the autonomous second pressure generating unit 34 for generating brake pressure within the scope of a vehicle stability control (VSC function). Moreover, the autonomous second pressure generating unit 34 is also used for the adaptive cruise control (ACC function). In the process, the autonomous second pressure generating unit 34 can build up brake fluid pressure for autonomously braking the vehicle in the course of a stop-and-go function in frequent succession and not just in extraordinary, relatively rare driving situations. This also occurs with predominantly low to moderate driving speeds, at which the basic noise level in the vehicle interior is relatively low. Under such conditions, known pressure generating units represent a source of noise and pulsation that is annoying in terms of driving comfort.

It will be understood that the vehicle brake system 10 may include a hydraulic control unit (HCU) (shown schematically in FIG. 1) connected in fluid communication between the master brake cylinder 18 and wheel brake cylinders 28, the HCU typically includes a housing containing the various control valves and other components described herein for selectively controlling hydraulic brake pressure at the wheel brake cylinders 28.

As shown at 54 in FIG. 1, the vehicle brake system 10 may include an electronic control unit (ECU) which receives input signals from sensors, such as yaw rate, master cylinder pressure, lateral acceleration, steer angle, and wheel speed sensors. The ECU may also receive ground speed data from the ACC system 56. The ACC system may receive input data from a radar and the vehicle yaw rate sensor. One example of a vehicular control system adapted to control fluid pressure in an electronically-controlled vehicular braking system and an electronically-controlled ACC system is disclosed in U.S. Pat. No. 6,304,808 to Milot, which is incorporated herein by reference.

Figure 2:
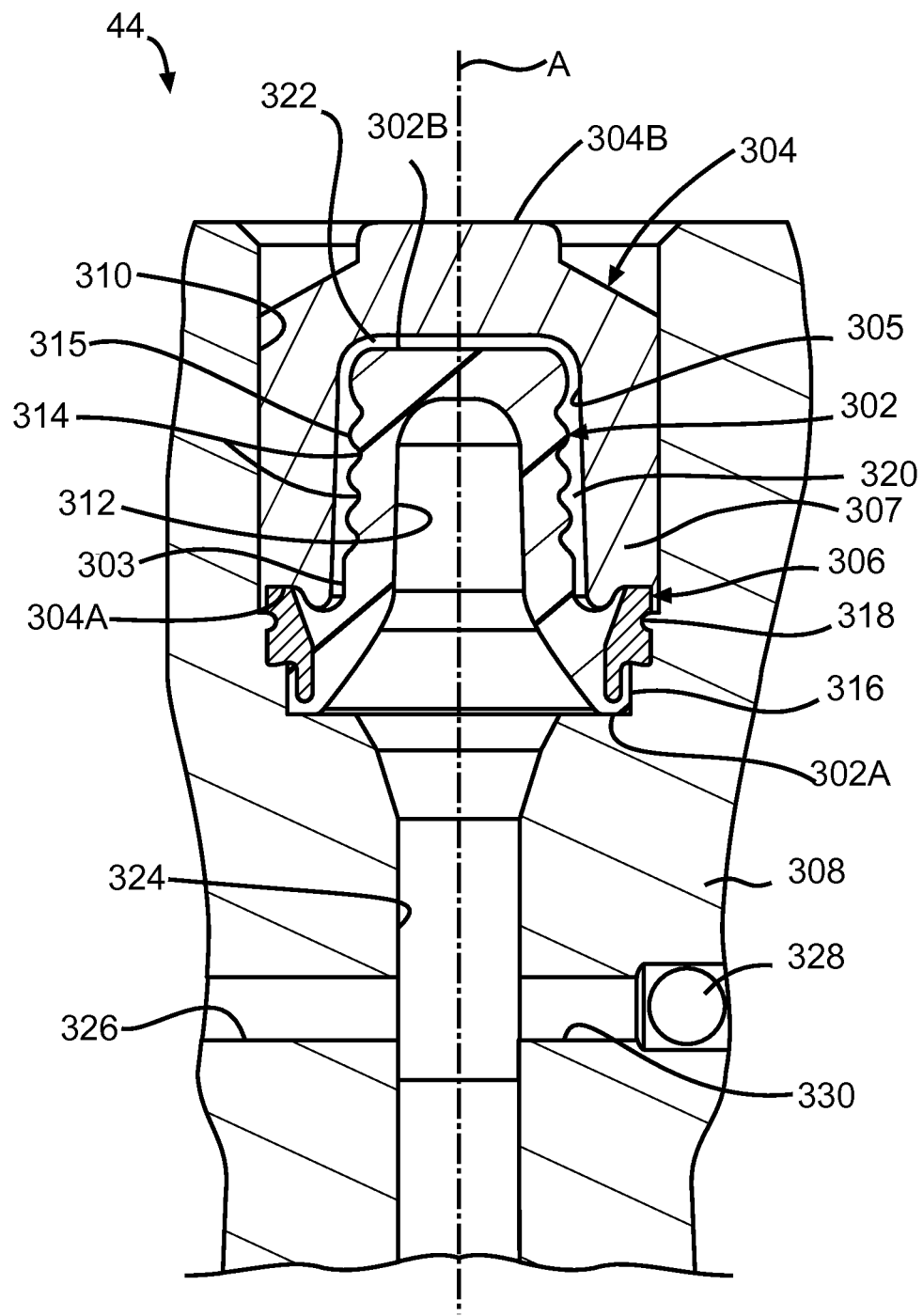
FIG. 2 is an enlarged cross sectional view of a first embodiment of the attenuator illustrated in FIG. 1.

Referring now to FIG. 2, there is illustrated at 44 a first embodiment of the attenuator assembly. In the illustrated embodiment, the attenuator assembly 44 includes an elastomeric member or attenuator 302 disposed in an end plug 304. A sealing ring 306 retains the attenuator 302 and end plug 304 in a chamber or bore 310 formed in a housing or valve body, a portion of which is shown at 308. In the embodiment illustrated in FIG. 2, the cavity 305 of the end plug 304 defines an attenuator chamber 305 of the housing or valve body 308. In the illustrated embodiment, the valve body 308 is a hydraulic control unit (HCU). The bore 310 has an axis A and may have more than one inside diameter.

The attenuator 302 defines a moderately deformable member, and is formed from an elastomeric material, such as EPDM rubber. Alternatively, the attenuator 302 may be formed from any other moderately deformable material, such as urethane, nitrile, or other polymer. The illustrated attenuator 302 has an outside surface 303, a first axial end 302A defining a first end face, and a closed second axial end 302B defining a second end face. An axially extending cavity 312 is formed in the first end face 302A. A plurality of circumferentially extending grooves 314 are formed in the outside surface 303 of the attenuator 302. The grooves 314 define circumferentially extending ribs 315 between adjacent grooves 314. The first axial end 302A further includes a radially extending flange 316.

The sealing ring 306 has an outside diameter slightly larger than an inside diameter of the bore 310 in the region where interference is designed to occur. A circumferentially extending groove 318 is formed in the outer circumferential surface of the ring 306. In the illustrated embodiment, the sealing ring 306 is integrally formed within the flange 316 of the attenuator 302. It will be understood that the sealing ring 306 need not be integrally formed within the flange 316.

In the illustrated embodiment, the sealing ring 306, and therefore the attenuator attached to the sealing ring 306, is retained within the bore 310 by clinching, wherein material of the valve body 308 is forced into the groove 318. The combined attenuator 302 and sealing ring 306 may also be retained in the bore 310 by any desired mechanical or chemical means operative to retain the attenuator 302 within the bore 310. The sealing ring 306 and flanges 316 are effective to seal the attenuator 302 within the bore 310 such that fluid flow is prevented between the inside surface or axially extending cavity 312 and the outside surface 303 of the attenuator 302.

The end plug 304 is a substantially rigid member having a first axial end or open end 304A, a second axial end or closed end 304B, an outside diameter slightly smaller than an inside diameter of the bore 310, and the axially extending cavity 305 formed within the end plug 304 and extending axially inwardly from the open end 304A. The attenuator chamber 305 further defines a shoulder 307. The attenuator 302 is disposed within the attenuator chamber 305 such that the flange 316 locates the attenuator 302 in a predetermined axial position within the attenuator chamber 305. The flange 316 and the sealing ring 306 engage the shoulder 307 of the open end 304A of the end plug 304. An annular space 320 is defined between the outside surface 303 of the attenuator 302 and a side wall of the attenuator chamber 305. An axial space 322 is also defined between the closed second axial end 302B of the attenuator 302 and the closed end 304B of the end plug 304.

An axial passageway 324 is formed in the valve body 308 and connects the cavity 312 of the attenuator and the two-stage orifice 38. An inlet passageway 326 is also formed in the valve body 308 and allows fluid flow between the pump 36 and the axial passageway 324. A ball plug 328 may be disposed in a transverse passageway 330 which connects the axial passageway 324 and the two-stage attenuator orifice.

Figure 3:
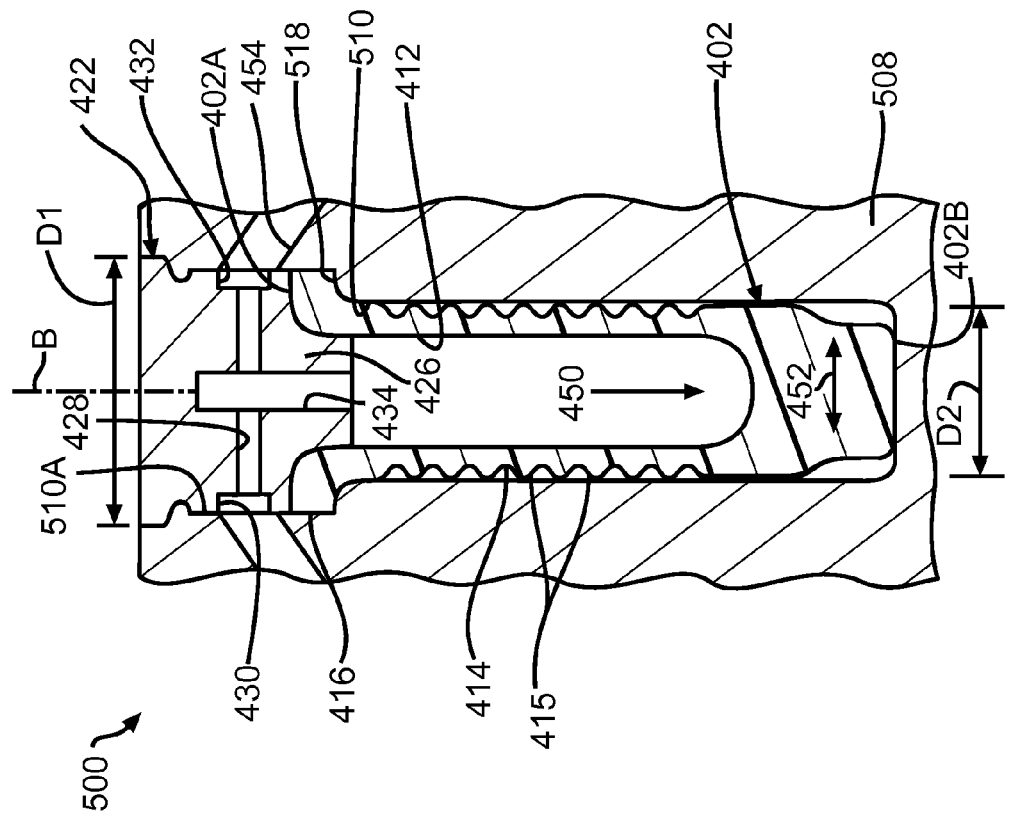
FIG. 3 is an enlarged cross sectional view of a second embodiment of the attenuator illustrated in FIG. 1.

Referring now to FIG. 3, there is illustrated at 500, a second embodiment of the attenuator assembly. In the illustrated embodiment, the attenuator assembly 500 includes the attenuator 402, described in detail below. The attenuator 402 is disposed in a chamber or bore 510 in the valve body 508 that contains the attenuator assembly 500. The bore 510 has an axis B and may have more than one inside diameter. In the illustrated embodiment, the bore 510 includes a first portion 510A having a first diameter D1, and a second portion 510B having a second diameter D2, wherein the diameter D1 is larger than the diameter D2. In the embodiment illustrated in FIG. 3, the bore 510 defines an attenuator chamber 510 of the valve body 508. The attenuator channel further defines a shoulder 518 between the first portion 510A and the second portion 510B of the attenuator chamber 510.

The attenuator 402 is disposed within the bore 510 such that the flange 416 locates the attenuator 402 in a predetermined axial position within the attenuator chamber 510. The flange 416 of the attenuator 402 abuts the shoulder 518 of the bore 510. The end plug 422, also described in detail below, engages the first axial end 402A of the attenuator 402 and retains the attenuator 402 in the bore 510.

In operation, fluid entering the attenuator cavity 412 causes radial deflection of the plurality of circumferentially extending grooves 414. Simultaneously, the fluid entering the attenuator cavity 412 also causes axial deflection of the attenuator 402 in the direction of the arrow 450. The axial deflection then initiates radial expansion of the attenuator 402 in the area of 402B in the direction of the arrow 452.

Figure 4:
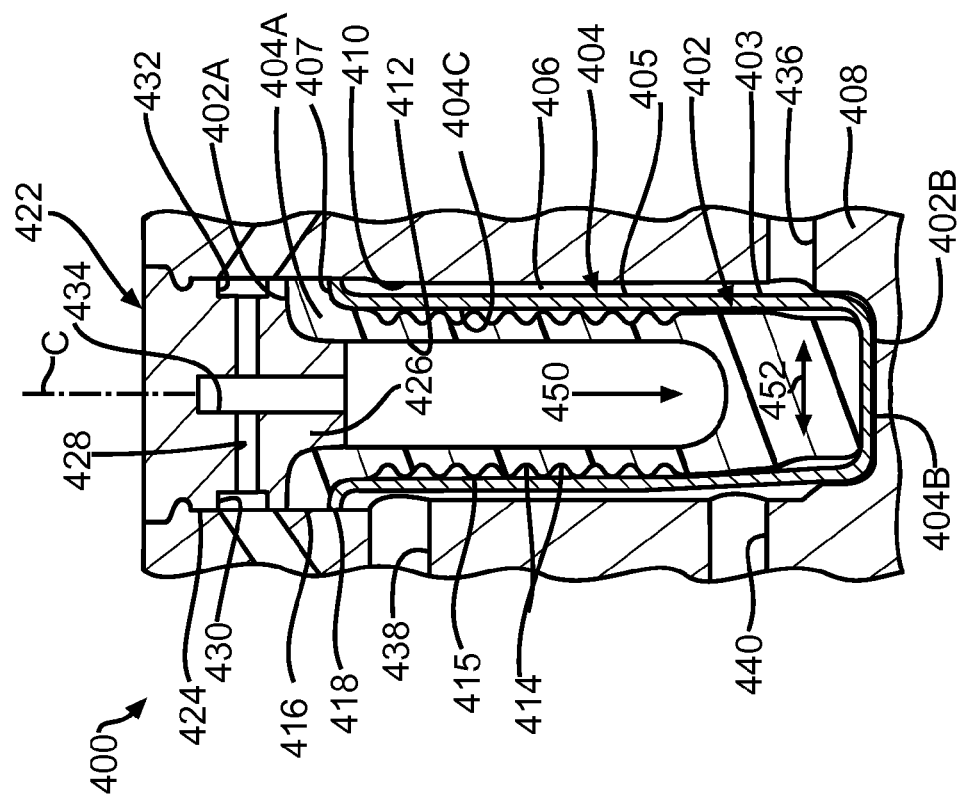
FIG. 4 is an enlarged cross sectional view of a third embodiment of the attenuator illustrated in FIG. 1.

Referring now to FIG. 4, there is illustrated at 400, a third embodiment of the attenuator assembly. In the illustrated embodiment, the attenuator assembly 400 includes an elastomeric member or attenuator 402 that is constrained by a rigid tube 404. The rigid tube 404 is disposed within a chamber or bore 410 in the valve body 408. An outer surface 405 of the tube 404 also serves as one side (an inside surface) of an annular fluid passage 406 in a valve body, a portion of which is shown at 408. In the illustrated embodiment, the valve body 408 is an HCU. The other side (an outside surface) of the annular passage 406 is defined by the bore 410 in the valve body 408 that contains the attenuator assembly 400. The bore 410 has an axis C and may have more than one inside diameter.

The attenuator 402 defines a moderately deformable member, and is formed from an elastomeric material, such as EPDM rubber. Alternatively, the attenuator 402 may be formed from any other moderately deformable material, such as urethane, nitrile, or other polymer. The illustrated attenuator 402 is substantially elongated and has an outside surface 403, a first axial end 402A defining a first end face, and a closed second axial end 402B defining a second end face. An axially extending cavity 412 is formed in the first end face 402A. A plurality of circumferentially extending grooves 414 are formed in the outside surface 403 of the attenuator 402. The grooves 414 define circumferentially extending ribs 415 between adjacent grooves 414. The first axial end 402A further includes a radially extending flange 416.

The tube 404 is a substantially rigid member having a first axial end or open end 404A, a second axial end or closed end 404B, and an outside diameter smaller than an inner diameter of the bore 410. In the embodiment illustrated in FIG. 4, an inside surface of the tube 404 defines an attenuator chamber 404C of the housing or valve body 308. The open end 404A includes a radially extending flange 418, and the attenuator chamber 404C further defines a shoulder 407. An annular space between the outer surface 405 of the tube 404 and a wall of the bore 410 define the annular fluid flow passage 406 for fluid flow within the valve body 408. The attenuator 402 is disposed within the tube 404 such that the flange 416 locates the attenuator 402 in a predetermined axial position within the attenuator chamber 404C. The flange 416 of the attenuator 402 abuts the flange 418 of the tube 404. A retainer or end plug 422 engages the first axial end 402A of the attenuator 402 and retains the attenuator assembly 400 in the bore 410.

The retainer 422 has a substantially cylindrical outer wall 424 which sealingly engages the wall of the bore 410. A substantially cylindrical plug portion 426 extends axially outwardly of the retainer 422 (downwardly when viewing FIG. 4), extends partially into the cavity 412, and sealingly engages a wall of the cavity 412. A transverse passageway 428 extends between and connects a fluid inlet 430 and a fluid outlet 432 formed in the retainer 422. The fluid outlet 432 is connected to a passageway 454. Brake fluid may flow from the pump 36, through the inlet 430, passageway 428, and outlet 432, to the two-stage orifice 38. An axial passageway 434 is formed in the retainer 422 and connects the transverse passageway 428 with the cavity 412.

An inlet passageway 436 is formed in the valve body 408 and allows fluid flow between the two-stage orifice 38 and the annular fluid flow passage 406. First and second outlet passageways 438 and 440 are also formed in the valve body 408. The outlet passageways 438 and 440 allow fluid flow between the annular fluid flow passage 406 and valves, such as the ABS inlet valves 30.

Advantageously, the illustrated embodiment of the attenuator assembly 400 allows the valve body 408 to have a reduced or relatively small package size when used with a conventional Electronic Stability Control (ESC) hydraulic circuit.

Figure 5:
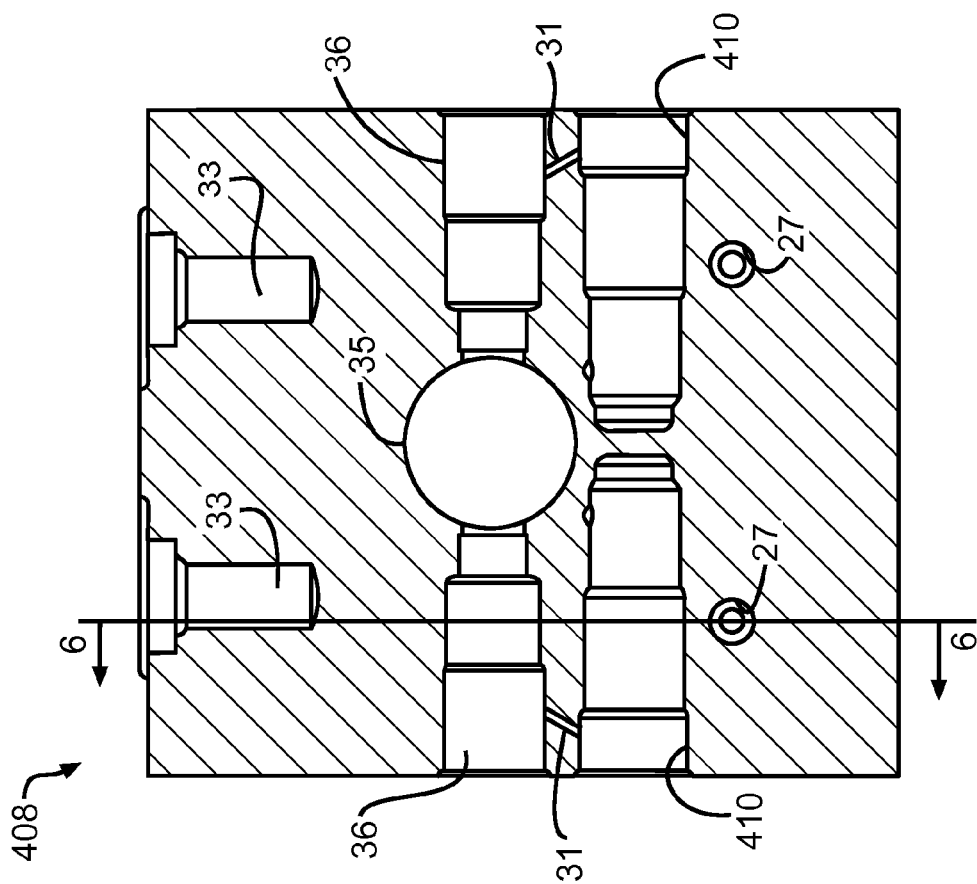
FIG. 5 is a first cross sectional view of an exemplary HCU showing the third embodiment of the attenuator illustrated in FIG. 4.
Figure 6:
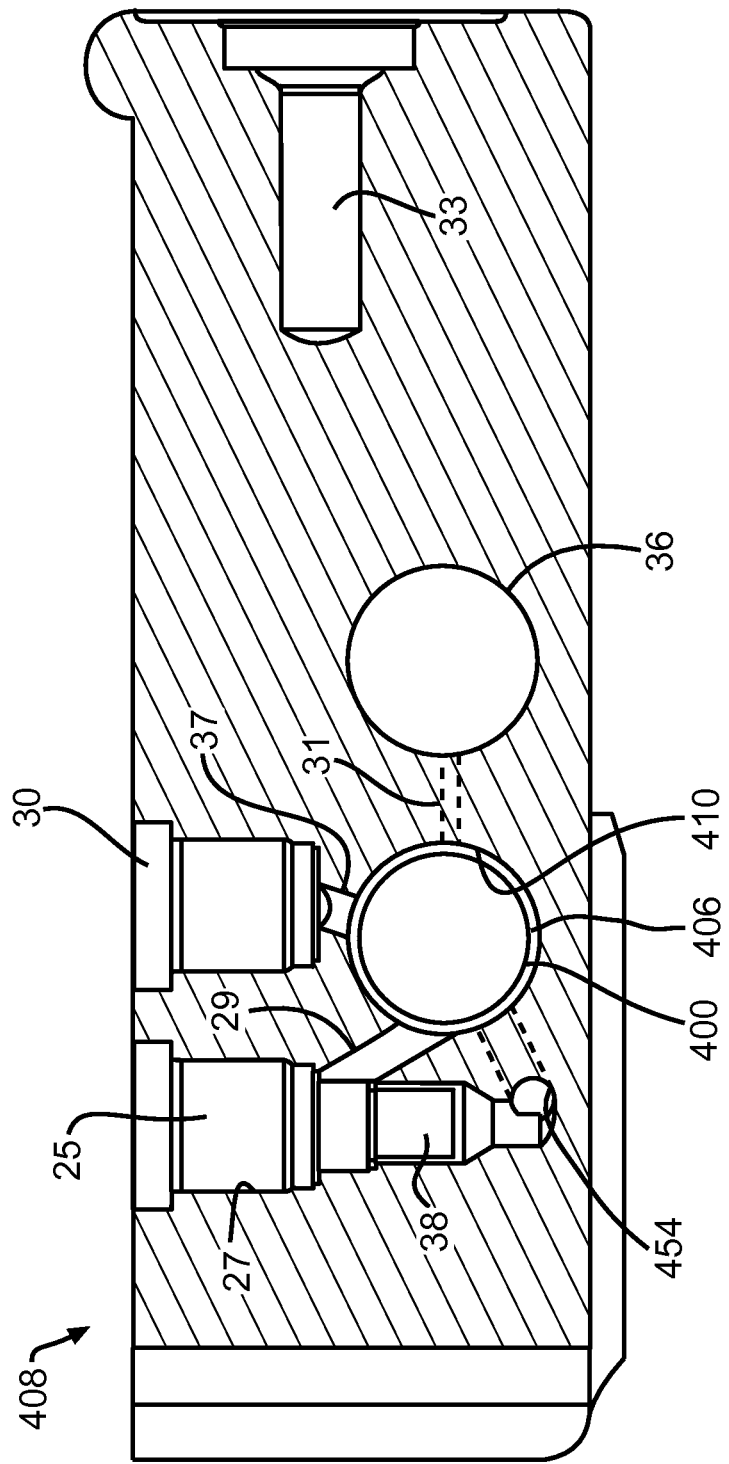
FIG. 6 is a second cross sectional view taken along the line 6-6 of FIG. 5.

Referring now to FIGS. 5 and 6, an exemplary embodiment of the reduced package size HCU is shown at 408. The illustrated HCU 408 includes the pump 36 and the attenuator assembly 400 disposed in the bore 410. The pump 36 and the attenuator assembly 400 are interconnected by a bore 31. As best shown in FIG. 6, the HCU 408 further includes the two-stage orifice 38 (shown schematically) in a bore 27 with the traction control isolation valve 25. The illustrated HCU 408 also includes two ABS isolation valves 30, only one of which is visible in FIG. 6. A bore 29 connects the TC isolation valve 25 and the annular flow passageway 406. The HCU 408 may also include low pressure accumulators 33. The illustrated opposing pumps 36 are driven by an eccentric (not shown) in an eccentric bore 35.

Referring to FIGS. 4, 5, and 6, in operation, fluid flows from the pump 36 through the bore 31, the passageway 428, into the attenuator cavity 412, and through the fluid outlet 432 to the switchable orifice 38. From the switchable orifice 38, fluid flows to the TC isolation valve 25 and through the bore 29, around the annular fluid passage 406, and through bores 37 (only one of which is visible in FIG. 6), to the ABS isolation valves 30, for example the front left and rear right isolation valves 30 illustrated in FIG. 1.

Additionally, boosted brake applies and/or releases will create fluid flow through the annular fluid passage 406 that will purge any trapped air. Because the two-stage orifice 38 is packaged in a way that allows flow through the attenuator cavity 412 during operation of the pump 36, any air trapped in the attenuator cavity 412 may therefore also be purged. In operation, fluid entering the attenuator cavity 412 causes radial deflection of the plurality of circumferentially extending grooves 414. Simultaneously, the fluid entering the attenuator cavity 412 also causes axial deflection of the attenuator 402 in the direction of the arrow 450. The axial deflection then initiates radial expansion of the attenuator 402 in the area of 402B in the direction of the arrow 452.

Figure 7:
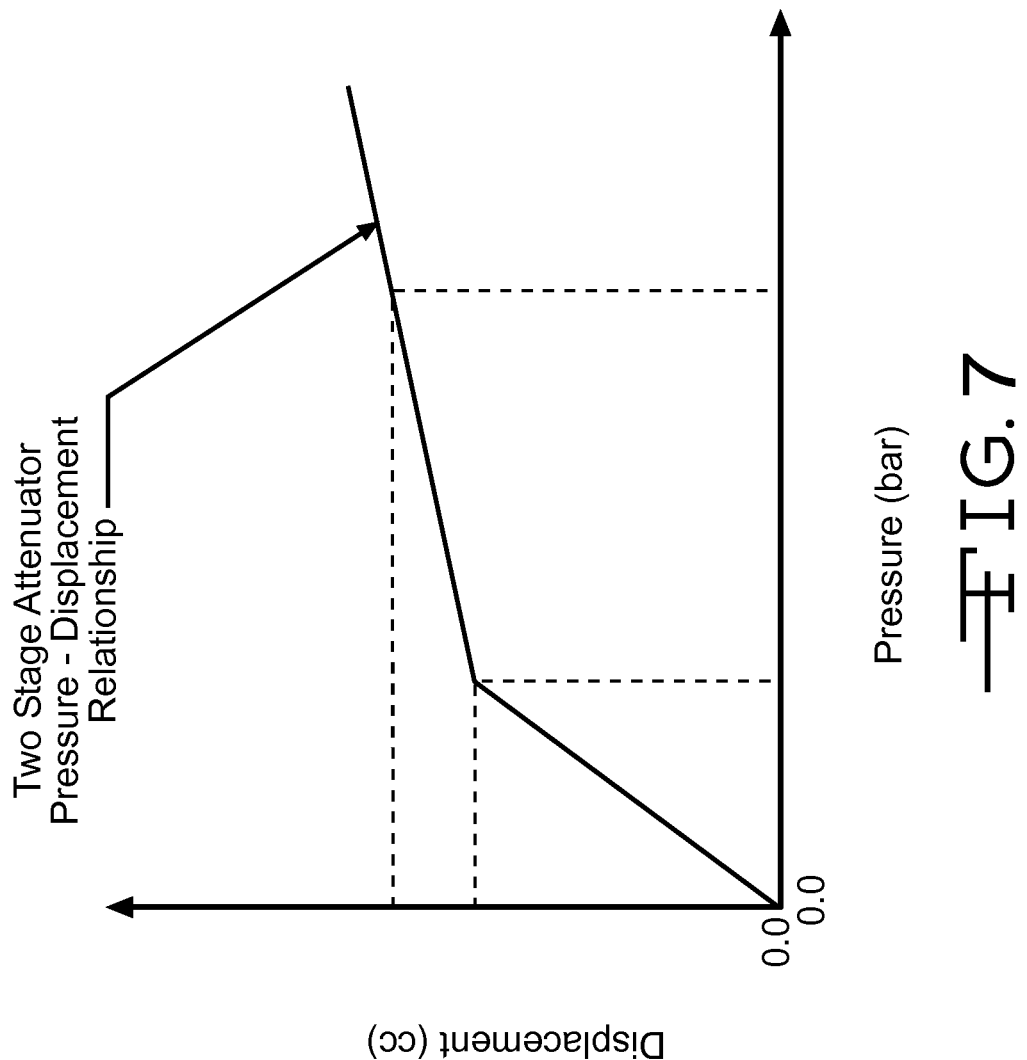
FIG. 7 is a graph of fluid volume displaced into the attenuator vs. pressure.

FIG. 7 illustrates an exemplary pressure-displacement relationship in two-stage attenuators such as illustrated in FIGS. 2, 3, and 4. As shown in the graph of FIG. 7, the two-stage attenuator is more compliant (i.e., volume (cc) per pressure (bar)) in lower pressure regions, and less compliant in higher pressure regions.

Figure 8:
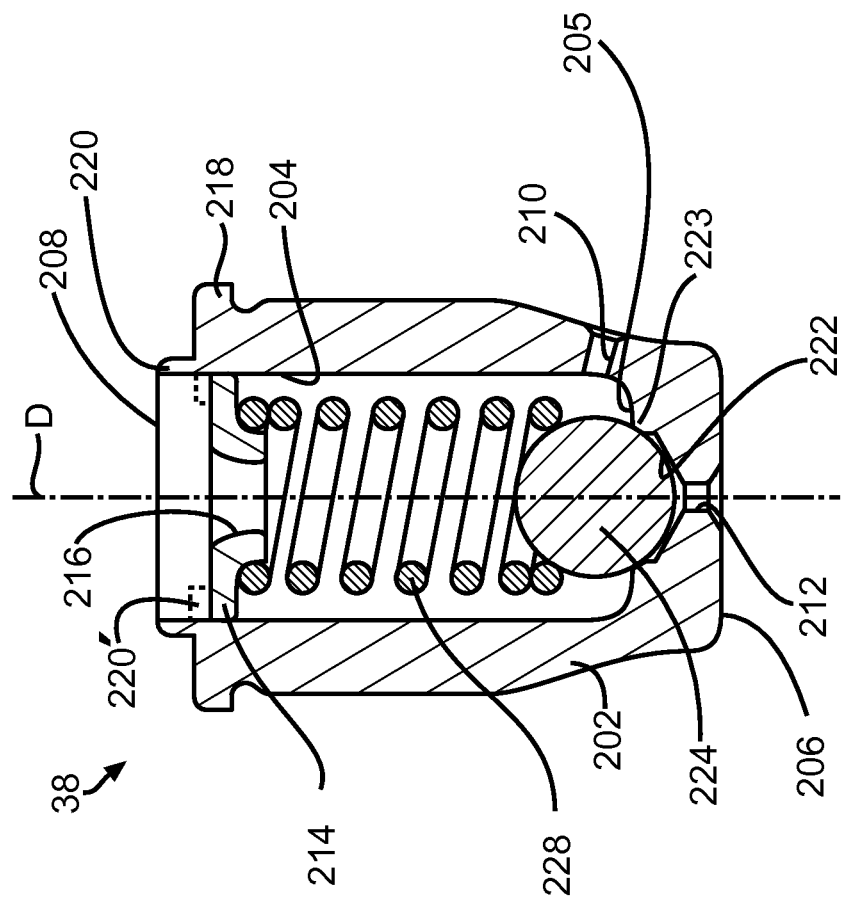
FIG. 8 is an enlarged cross sectional view of the two-stage orifice illustrated in FIG. 1.

Referring now to FIG. 8, an exemplary embodiment of the switchable or two-stage orifice is illustrated at 38. The two-stage orifice 38 includes a cartridge body 202 having a substantially cylindrical bore 204 defining a longitudinal axis D. The body 202 further has an inlet end 206 and an outlet end 208. First and second inlet openings 210 and 212, respectively, are formed at the inlet end 208 and extend from an outer surface of the body 202 to the bore 204. The second inlet opening 212 is formed coaxially with the bore 204. An annular spring retainer 214 is disposed within the bore 204 at the outlet end 208. An axially extending fluid passage 216 is formed through the spring retainer 214 and defines an outlet opening of the two-stage orifice 38.

The outlet end 208 further includes a radially extending flange 218 and an axially extending wall portion 220. A cavity 222 is formed in an end wall 205 of the bore 204 (lower end of the bore 204 when viewing FIG. 2) and defines a valve seat 223. A spherical closing element or ball 224 is urged into sealing engagement with the valve seat 223 by a compression spring 226 which extends axially from the retainer 214 to the ball 224, thereby defining a closed position of the two-stage orifice 38. In the closed position, the second inlet opening 212 is closed by the ball 224, thereby allowing brake fluid from the pump 36 to only flow through the first inlet opening 210. During assembly, the axially extending wall portion 220 is crimped or deformed radially inwardly, as shown at 220', to retain the retainer 214, spring 226, and ball 224 within the bore 204.

During operation, when brake fluid pressure from the pump 36 is less than the pre-stressed force of the spring 226, the second inlet opening 212 will remain closed and fluid will flow only through the first inlet opening 210. When brake fluid pressure from the pump 36 is greater than the pre-stressed force of the spring 226, the ball 224 will be urged away from the valve seat 223, and the second inlet opening 212 will open, allowing fluid to flow through the second inlet opening 212.

Figure 9:
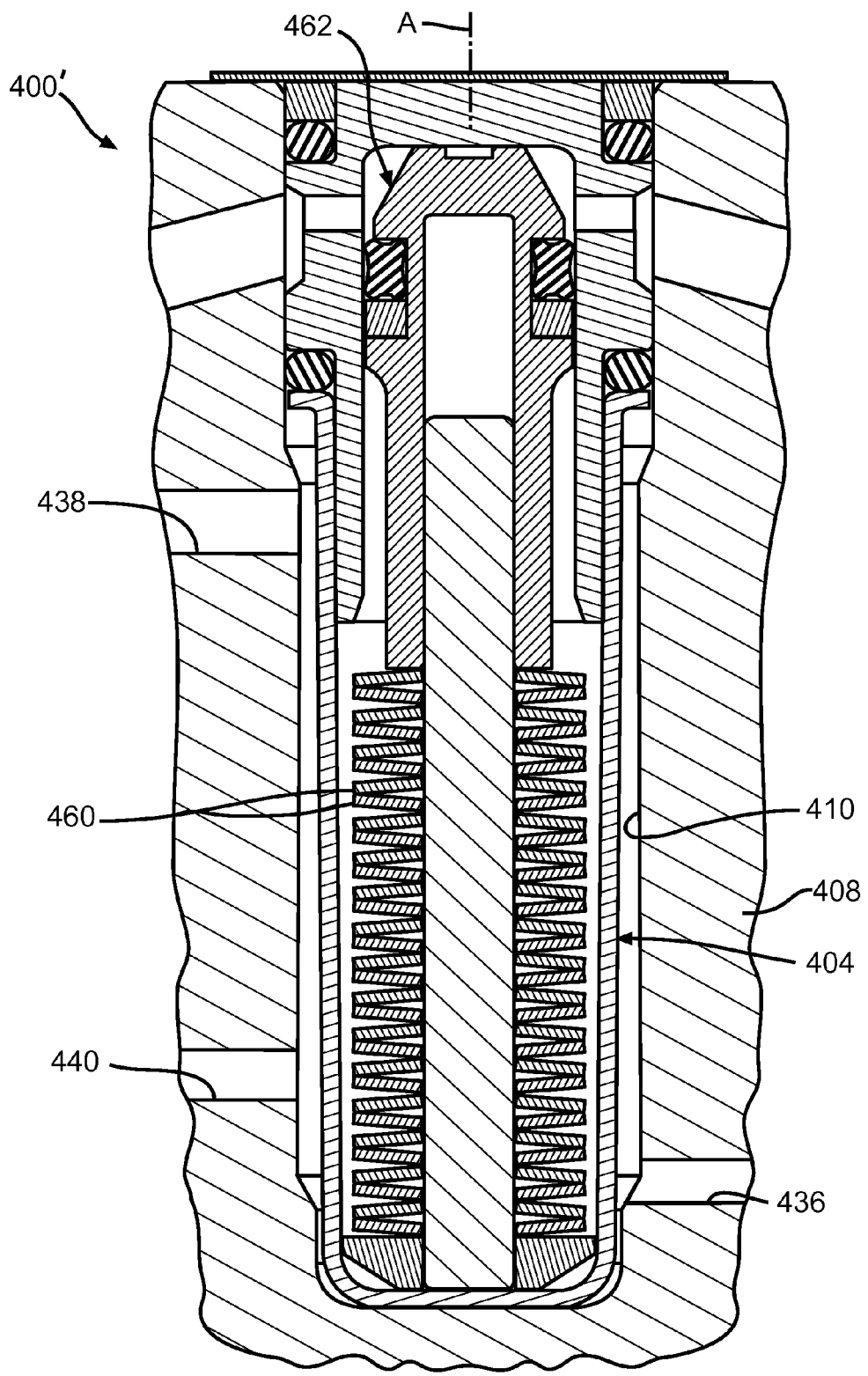
FIG. 9 is an enlarged cross sectional view of a fourth embodiment of the attenuator illustrated in FIG. 1.

The attenuator assemblies 44, 500, and 400 illustrated in FIGS. 2, 3, and 4 include elastomeric members 302 and 402. Alternatively, other structures may be provided in the attenuator assemblies 44, 500, and 400. One example of a suitable alternative structure is a damping capsule, such as the damping capsule disclosed in International Application Publication No. WO 2009/103709 A1. Another example of a suitable alternative structure is a piston and seal assembly 462 which is displaced by pressure against a plurality of disk springs or Belleville washers, such as shown at 460 in the attenuator assembly 400' shown in FIG. 9. The attenuator assembly 400' shown in FIG. 9 is an alternate embodiment of the attenuator assembly 400.

The principle and mode of operation of the attenuator have been described in its preferred embodiment. However, it should be noted that the attenuator described herein may be practiced otherwise than as specifically illustrated and described without departing from its scope.

What is claimed is:

1. A vehicle braking system including a slip control system,
   the slip control system operable in an electronic stability control (ESC) mode to automatically and selectively apply the brakes in an attempt to stabilize the vehicle when an instability condition has been sensed,
   the slip control system further operable in an adaptive cruise control (ACC) mode to automatically apply the brakes to slow the vehicle in response to a control signal,
   the slip control system including a variable speed motor drive piston pump for supplying pressurized fluid pressure to the brakes through a valve arrangement, and wherein in the ESC mode the pump motor operates in an ESC speed range and in the ACC mode the pump motor operates in an ACC speed range lower than the ESC speed range,
   the slip control system further including an attenuator connected to a pump outlet for dampening pump output pressure pulses prior to application to the brakes, the attenuator including an elastomeric member located in an attenuator chamber of an hydraulic control unit (HCU),
   characterized in that:
   the attenuator chamber is defined by a rigid tube which is disposed within a bore of the HCU,
   the attenuator chamber defines a shoulder and the elastomeric member includes a flange which rests on the shoulder and locates the elastomeric member in a predetermined axial position within the attenuator chamber,
   an annular space is defined between an outer surface of the rigid tube and a wall of the bore of the HCU, the annular space defining an annular fluid flow passage for brake fluid flow within the HCU, and
   an outside wall of the elastomeric member includes circumferentially extending grooves defining ribs between adjacent grooves.

2. The vehicle braking system according to claim 1, wherein the flange defines a seal which prevents fluid flow between an inside surface of the elastomeric member and an outside surface of the elastomeric member.

3. The vehicle braking system according to claim 2, wherein the inside surface of the elastomeric member defines an attenuator cavity.

4. The vehicle braking system according to claim 3, further including an end plug located in the attenuator chamber, the end plug urging the flange into sealing engagement with the shoulder.

5. The vehicle braking system according to claim 4, wherein the end plug includes a plug portion extending partially into the attenuator cavity.

6. The vehicle braking system according to claim 4, wherein the end plug includes a fluid passageway defining a fluid flow path from the piston pump to the attenuator cavity.

7. The vehicle braking system according to claim 1, wherein the rigid tube defines the shoulder upon which the flange of the elastomeric member rests.

8. The vehicle braking system according to claim 1, wherein the flange locates an end wall of the elastomeric member in spaced relation relative to the end wall of the attenuator chamber.

* * * * *